A. L. MILKS.
VEHICLE BODY.
APPLICATION FILED JAN. 30, 1920.
1,361,603.
Patented Dec. 7, 1920.
2 SHEETS—SHEET 1.
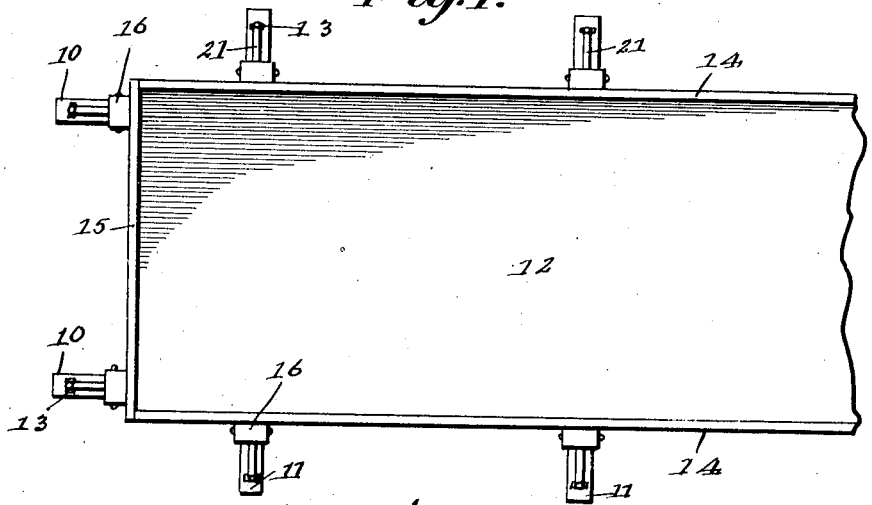
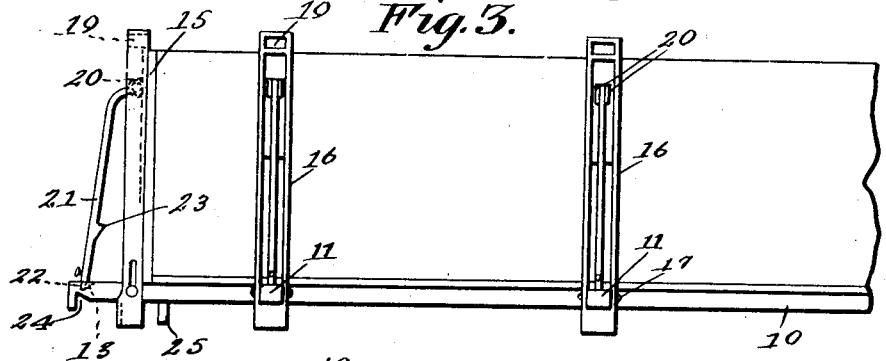
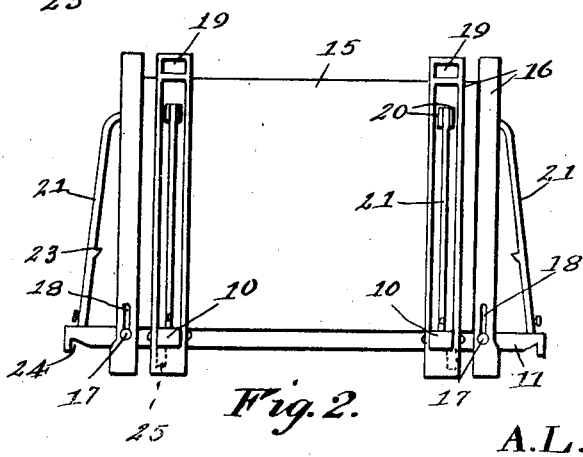
A. L. Milks
INVENTOR
BY Victor J. Evans
ATTORNEY
WITNESSES A. L. MILKS.
VEHICLE BODY.
APPLICATION FILED JAN. 30, 1920.
1,361,603.
Patented Dec. 7, 1920.
2 SHEETS—SHEET 2.
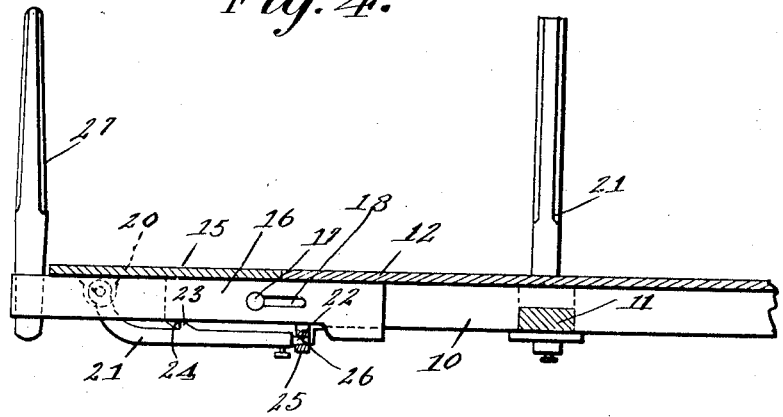
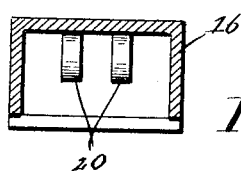
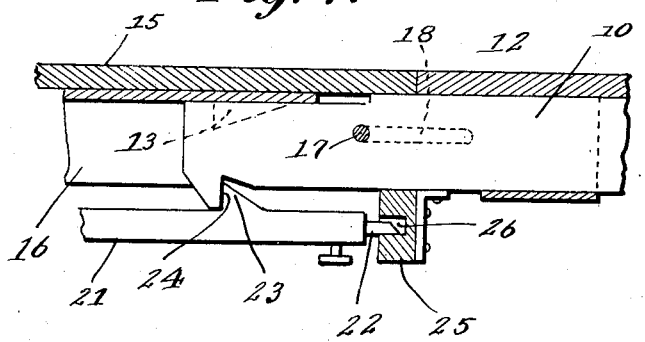
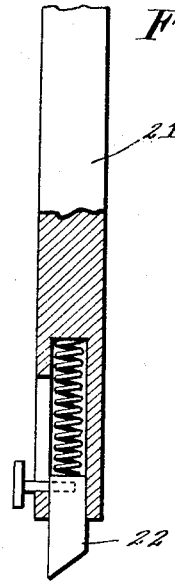
A. L. Milks
INVENTOR
BY *Victor J. Evans*
ATTORNEY
WITNESSES

UNITED STATES PATENT OFFICE.

ALVIN L. MILKS, OF PARSONS, KANSAS, ASSIGNOR OF ONE-HALF TO HARRY S. MILKS, OF PARSONS, KANSAS.

VEHICLE-BODY.

1,361,603.  Specification of Letters Patent.  Patented Dec. 7, 1920.

Application filed January 30, 1920. Serial No. 355,135.

*To all whom it may concern:*

Be it known that I, ALVIN L. MILKS, a citizen of the United States, residing at Parsons, in the State of Kansas, have invented new and useful Improvements in Vehicle-Bodies, of which the following is a specification.

This invention relates to vehicle bodies adapted for use either upon farm wagons or upon motor trucks, and has for its object the provision of a body which is convertible whereby it may be formed into a box body or a stake body.

An important object is the provision of a body of this character including novel hinge members which connect the sides and ends of the body and yet which may be movable whereby the sides and ends may be disposed upright or laid flat to form continuations of the bottom, the hinge construction including means for holding the sides and ends immovable in either selected position.

An additional object is the provision of a device of this character which will be simple and inexpensive in manufacture, highly efficient in use, durable in service, and a general improvement in the art.

With the above and other objects and advantages in view the invention consists in the details of construction to be hereinafter more fully described and claimed, and illustrated in the accompanying drawings in which—

Figure 1 is a plan view of a body constructed in accordance with my invention,

Fig. 2 is a rear elevation,

Fig. 3 is a side elevation,

Fig. 4 is a longitudinal sectional view showing the parts arranged to form a stake body, and The remaining figures are detail views.

Referring more particularly to the drawings, the numeral 10 designates the side sills which are suitably connected by cross bars 11 upon which are secured boards forming the bottom 12. The sills 10 and bars 11 extend beyond the bottom and have their outer ends provided with recesses 13. The numerals 14 and 15 designate the sides and ends, respectively, which are of the same height.

Secured to the sides 14 and ends 15 are bars 16 which are of greater length than the height of the sides and ends and which are connected with the sills 10 or bars 11, as the case may be, by bolts 17 extending from the sills or bars and engaging within elongated slots 18 in the bars 16. By this connection it will be seen that the bars 16 are pivotally and also slidably connected with the sills or cross bars. The bars 16 are preferably formed of metal constructed and having the nature of open frames and they are arranged with the sills or cross bars extending through the open portions thereof.

Formed within the extreme upper portions of the bars 16 are sockets 19 for a purpose to be hereinafter described. Also formed on the bars 16 below the sockets 19 are ears 20 between which are pivotally mounted brace arms 21 formed slightly angular in shape and having their free ends provided with spring-pressed catches 22 adapted to engage within the notches or recesses 13. Also formed upon the inner edges of the braces 21 are shoulders 23 which are at certain times adapted to be engaged with similar shoulders 24 carried by the sills and cross bars. Secured beneath the sills and cross bars are strips or blocks 25 provided with recesses 26 adapted to receive the catches 22 when the brace arms 21 are in certain positions.

When the device is extended to be used as a box body the sides and ends 14 and 15 are arranged in upright position with their ends in abutting engagement and the bars or frames 16 are also in upright position with the spring-pressed catches 22 engaged within the recesses 13.

When it is desired to convert the body into a platform or stake body, the catches 22 are disengaged from the recesses 13 and the bars 16, together with the sides and ends, are swung downwardly into horizontal position with the sides and ends forming continuations of the bottom 12, the bolt and slot connections 17 and 18 permitting the necessary movement of the bars 16. The brace bars are also of course swung downwardly and are arranged beneath the sills or beneath the cross bars, as the case may be, with the spring-pressed catches 22 engaging within the recesses 26. The sides and ends which will then be disposed in horizontal position will be supported in this position and be prevented from swinging downwardly. At the same time any upward swinging of the sides and ends will be prevented by engagement of the shoulders 23 and 24. When the device is in this position it may be advisable to provide stakes 27 inserted through the sockets 19.

From the foregoing description and a study of the drawings it will be apparent that I have thus provided a simply constructed device and yet one which is readily convertible from one type of body into another and which will remain rigidly in adjusted position.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A vehicle body comprising side sills connected by cross bars, a bottom supported upon said sills and cross bars, side and end members, bars secured to the side and end members and pivotally connected with the sills or cross bars, brace members connected with said bars and detachably connected with the sills or cross bars for holding said sides and ends in upright position, said sides and ends being swingable outwardly and downwardly whereby to form continuations of the bottom, and means engageable by said braces for preventing further downward movement of the sides and ends, said means comprising strips secured beneath the sills and cross bars and engageable by said braces.

2. A vehicle body comprising longitudinal sills connected by cross bars, a bottom secured upon said sills and cross bars and terminating short of the ends thereof, the projecting ends of the sills and cross bars being provided with recesses, side and end members, bars secured to the sides and ends and pivotally and longitudinally slidably connected with the sills or cross bars, braces pivotally connected with said bars, catch members carried by the free ends of said braces and engageable within said recesses, and strips secured beneath the sills and cross bars and recessed for engagement by said catch members when said sides and ends and bars are swung downwardly and outwardly with the sides and ends forming continuations of the bottom.

In testimony whereof I affix my signature.

ALVIN L. MILKS.